(12) United States Patent
Kim

(10) Patent No.: US 8,571,377 B2
(45) Date of Patent: Oct. 29, 2013

(54) VIDEO PROCESSING APPARATUS AND CONTROL METHOD THEREOF

(75) Inventor: Eun-seok Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1207 days.

(21) Appl. No.: 12/139,615

(22) Filed: Jun. 16, 2008

(65) Prior Publication Data

US 2009/0092379 A1   Apr. 9, 2009

(30) Foreign Application Priority Data

Oct. 5, 2007 (KR) ........................ 10-2007-0100468

(51) Int. Cl.
*H04N 5/91* (2006.01)

(52) U.S. Cl.
USPC ............................................ 386/46; 386/326

(58) Field of Classification Search
USPC ................................................. 386/46, 326
See application file for complete search history.

(56) References Cited

U.S. PATENT DOCUMENTS

| 2004/0221146 | A1* | 11/2004 | Baumann ........................ 713/1 |
| 2005/0027831 | A1* | 2/2005 | Anderson et al. ............. 709/220 |
| 2005/0278461 | A1 | 12/2005 | Ohta |
| 2006/0100010 | A1* | 5/2006 | Gatto et al. ...................... 463/29 |

FOREIGN PATENT DOCUMENTS

| EP | 1434128 A1 | 6/2004 |
| EP | 1653366 A1 | 5/2006 |
| EP | 1672509 A2 | 6/2006 |

OTHER PUBLICATIONS

"Explorer 8300" Wikipedia. Jan. 16, 2007. XP002516701.
"MFSLive Frequently Asked Questions" Mar. 4, 2007. XP002517056.
"Explorer 8300 Digital Video Recorder User Guide" Cisco. Sep. 24, 2007. XP002516700.
Scientific Atlanta: "Explorer Digital Video Recorder" User's Guide,, [Online] Oct. 31, 2006, pp. 1-48, XP007913105 Retrieved from the Internet: URL:http://www.cisco.com/web/consumer/support/userguides2/4003870.pdf.
Scientific Atlanta: "Connecting the Explorer 8300TM Digital Video Recorder" May 31, 2005, [Online] May 31, 2005, pp. 1-20, XP007913107 Retrieved from the Internet: URL:http://dl.owneriq.net/1/15a7bf7b-1e58-4d2e-a181-07e8cc8a8879.pdf.
European Search Report issued on May 26, 2010 in counterpart European Application No. 08163615.1.
Office Action dated Oct. 21, 2010, in counterpart European Application No. 08163615.1
Summons to Attend Oral Proceedings dated Aug. 11, 2011, in counterpart European Application No. 08163615.1.

* cited by examiner

*Primary Examiner* — Jeffrey Pwu
*Assistant Examiner* — Helai Salehi
(74) *Attorney, Agent, or Firm* — Sughrue Mion, PLLC

(57) ABSTRACT

There are provided a video processing apparatus and a control method thereof. The video processing apparatus includes: a video processing unit which processes video data; and a controller which controls to store the video data in one of a plurality of partitions of an external storing unit in a video file system and to store a driver installation program for allowing a computer to process the video data in another one of the plurality of partitions of the external storing unit in a computer file system.

13 Claims, 4 Drawing Sheets

VIDEO PROCESSING APPARATUS AND CONTROL METHOD THEREOF

CROSS-REFERENCE TO RELATED APPLICATION

This application claims priority from Korean Patent Application No. 10-2007-0100468, filed on Oct. 5, 2007 in the Korean Intellectual Property Office, the disclosure of which is incorporated herein by reference.

BACKGROUND OF INVENTION

1. Field of Invention

Apparatuses and methods consistent with the present invention relate to a video processing apparatus and a control method thereof, and more particularly, to a video processing apparatus which stores video data in an external storing unit in a file system for a video play/edit function, and a control method thereof.

2. Description of Related Art

In general, a video processing apparatus such as a television or a set top box receives video data through a broadcast signal from a broadcasting station and processes the received video data to display an image. Recently, a video processing apparatus has been under development which can store video data after receiving it as well as while receiving it so as to use the video data whenever necessary.

Such a function of the video processing apparatus is referred to as a video play/edit function. A Personal Video Recorder (PVR) is an example of such a function. This function may include storing an image of a channel under broadcasting, still frame display, rewind, play slow, jump, edit, etc.

The video data for the video play/edit function is stored in a storing unit provided in the video processing apparatus, and may be stored in a computer for preservation or extension of use of the video data, etc. In the latter case, an external storing unit such as an external hard disk is employed to move the video data to the computer.

However, the video processing apparatus typically stores the video data in the storing unit in an exclusive use file system for the video play/edit function only, not in a file system such as FAT32, NTFS, etc. which is generally employed in the computer. This is because the file system such as FAT32, NTFS, etc. is employed for a general use computer system, and is not suitable for supporting a special function such as a video play/edit function. The exclusive use file system for the video play/edit function has a restoring function for use when the file system malfunctions and has an optimal speed for writing/reading a large size of file, but the general use file system does not.

Accordingly, in the case that the computer employs the video data stored in the external storing unit, an operation system of a computer such as MS-Windows can not recognize the exclusive use file system for the video play/edit function. Thus, a driver for the exclusive use file system should be installed in the computer in order to allow the computer to recognize the exclusive use file system.

Conventionally, the driver for the exclusive use file system is installed in the computer through a separate driver CD in which a driver installation program is stored. However, this causes inconvenience in that a user should manage the driver CD in addition to the external storing unit. Further, the driver CD increases the manufacturing cost of the video processing apparatus.

SUMMARY OF INVENTION

Accordingly, it is an aspect of the present invention to provide a video processing apparatus and a control method thereof which can effectively use a computer for a video play/edit function.

Additional aspects of the present invention will be set forth in part in the description which follows and, in part, will be obvious from the description, or may be learned by practice of the present invention.

The foregoing and/or other aspects of the present invention can be achieved by providing a video processing apparatus including: a video processing unit which processes video data; and a controller which controls to store the video data in one of a plurality of partitions of an external storing unit in a video file system and to store a driver installation program for allowing a computer to process the video data in another one of the plurality of partitions of the external storing unit in a computer file system.

The video file system may correspond to a file system of the video processing apparatus.

The computer file system may include one of FAT16, FAT32 and NTFS.

The video processing apparatus may further include a storing unit in which the driver installation program is stored.

The controller may control to reproduce the driver installation program stored in the storing unit into the external storing unit.

The controller may control to divide the external storing unit into the plurality of partitions.

Here, if the external storing unit is connected to the video processing apparatus, the controller may determine whether or not the driver installation program is stored in the external storing unit, and if not, may control to store the driver installation program in the external storing unit.

The video processing apparatus may further include a UI generating unit which generates a UI for storing the driver installation program.

The video processing apparatus may further include a display unit which displays an image based on the video data processed by the video processing unit.

The foregoing and/or other aspects of the present invention can be also achieved by providing a control method of a video processing apparatus, including: storing video data in one of a plurality of partitions of an external storing unit in a video file system; and storing a driver installation program for allowing a computer to process the video data in another one of the plurality of partitions of the external storing unit in a computer file system.

The video file system may correspond to a file system of the video processing apparatus.

The computer file system may include one of FAT16, FAT32 and NTFS.

The storing the driver installation program may include reproducing the driver installation program which is pre-stored into the external storing unit.

The control method may further include dividing the external storing unit into the plurality of partitions.

The control method may further include determining whether or not the driver installation program is stored in the external storing unit if the external storing unit is connected to the video processing apparatus.

The control method may further include generating a UI for storing the driver installation program.

The control method may further include displaying an image based on the video data.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
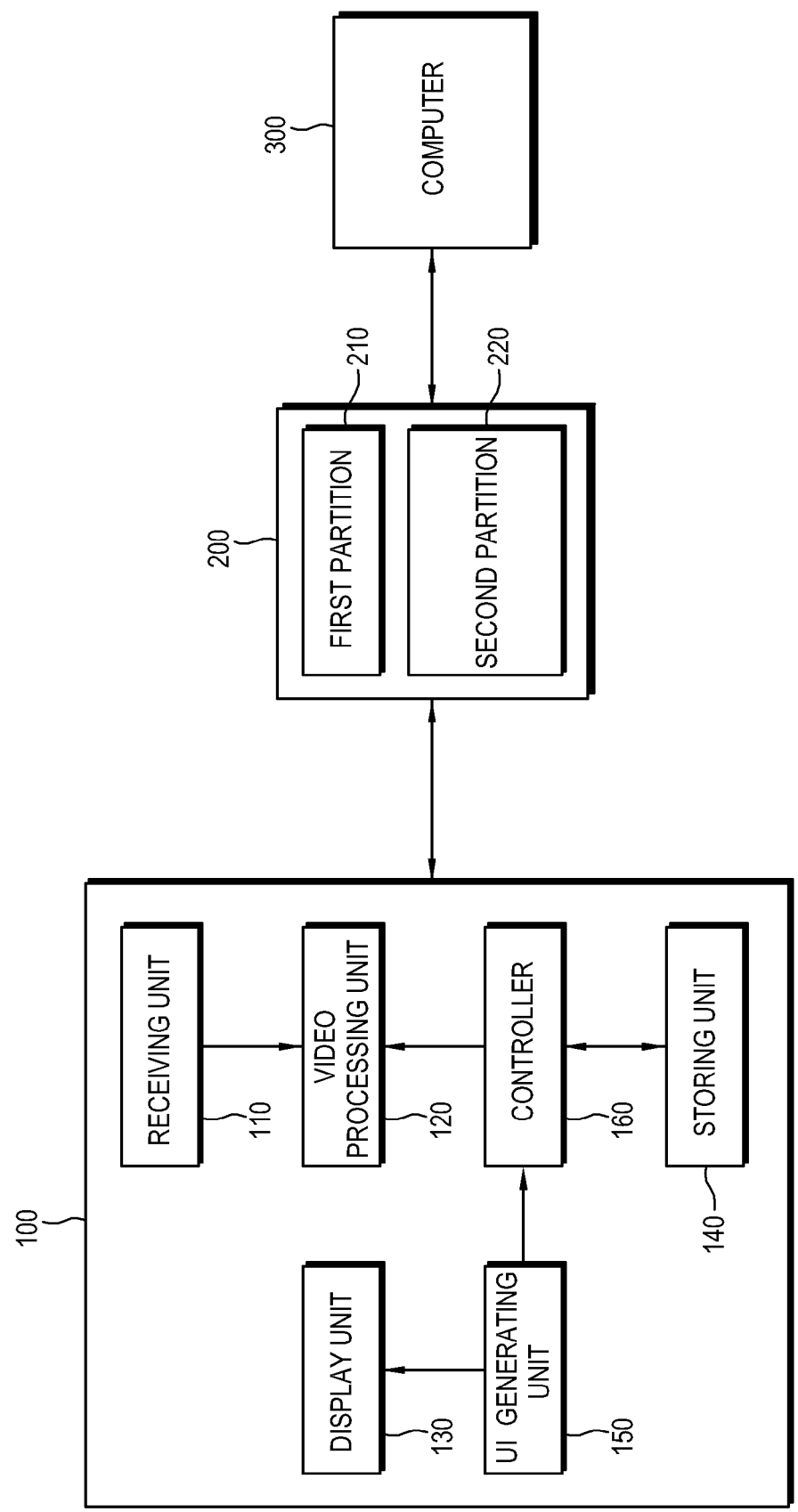
FIG. 1 is a block diagram illustrating a video processing apparatus according to an exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures.

Referring to FIG. 1, a video processing apparatus 100 according to an exemplary embodiment of the present invention may be provided as a television, a set top box, etc. The video processing apparatus 100 receives video data through a broadcast signal from a broadcasting station or the like and processes the video data to display an image. The video processing apparatus 100 may store the received video data and perform a video play/edit function such as a PVR.

The video data processed by the video processing apparatus may be used by a computer 300. Further, the processed video data may be transmitted to the computer 300 through an external storing unit 200 such as an external hard disk.

The video processing apparatus 100 stores the video data in the external storing unit 200 in an exclusive use file system for a video play/edit function (hereinafter, called a 'video file system'). The computer 300 has a file system other than the video file system (hereinafter, called a 'computer file system'). The computer file system may include FAT16, FAT32, NTFS, etc. The video processing apparatus 100 further stores a driver installation program for processing the video data in the external storing unit 200 in the computer file system so that the computer 300 can recognize the video data stored in the external storing unit 200.

As shown in FIG. 1, the video processing apparatus 100 may include a receiving unit 110, a video processing unit 120, a display unit 130, a storing unit 140, a UI generating unit 150, and a controller 160.

The receiving unit 110 receives a broadcast signal transmitted from a broadcasting station through an antenna or a cable. The broadcast signal includes the video data.

The video processing unit 120 may process the video data included in the broadcast signal or video data inputted from an external video source. The video source may include the external storing unit 200 in which the video data is stored. The video processing unit 120 may store video data in the external storing unit 200 by processing the broadcast signal under the control of the controller 160.

The display unit 130 displays an image based on the video data processed by the video processing unit 120. The display unit 130 may be provided as a CRT, an LCD, a PDP, or the like.

In the storing unit 140 is stored the driver installation program for allowing the computer 300 to process the video data. For example, the storing unit 140 may be provided as a flash memory which is provided in the video processing apparatus 100. In the storing unit 140 is further stored an operation system of the video processing apparatus 100, various hardware drivers, application programs, etc.

The computer 300 may process the video data stored in the external storing unit 200. For example, the computer 300 may be connected to the external hard disk 200 and write/read data in the external hard disk 200.

The UI generating unit 150 generates a UI (not shown) for storing the driver installation program. The UI may include items for partition-dividing of the external storing unit 200, formatting, file reproducing/storing, etc. A user may select a suitable item through the UI to make the video processing apparatus 100 perform a desired operation.

The controller 160 stores the video data in any one of a plurality of partitions of the external storing unit 200 in the video file system, and stores the driver installation program in another partition in the computer file system. The controller 160 may reproduce the driver installation program stored in the storing unit 140 into the external storing unit 200 to store the driver installation program.

Figure 2:
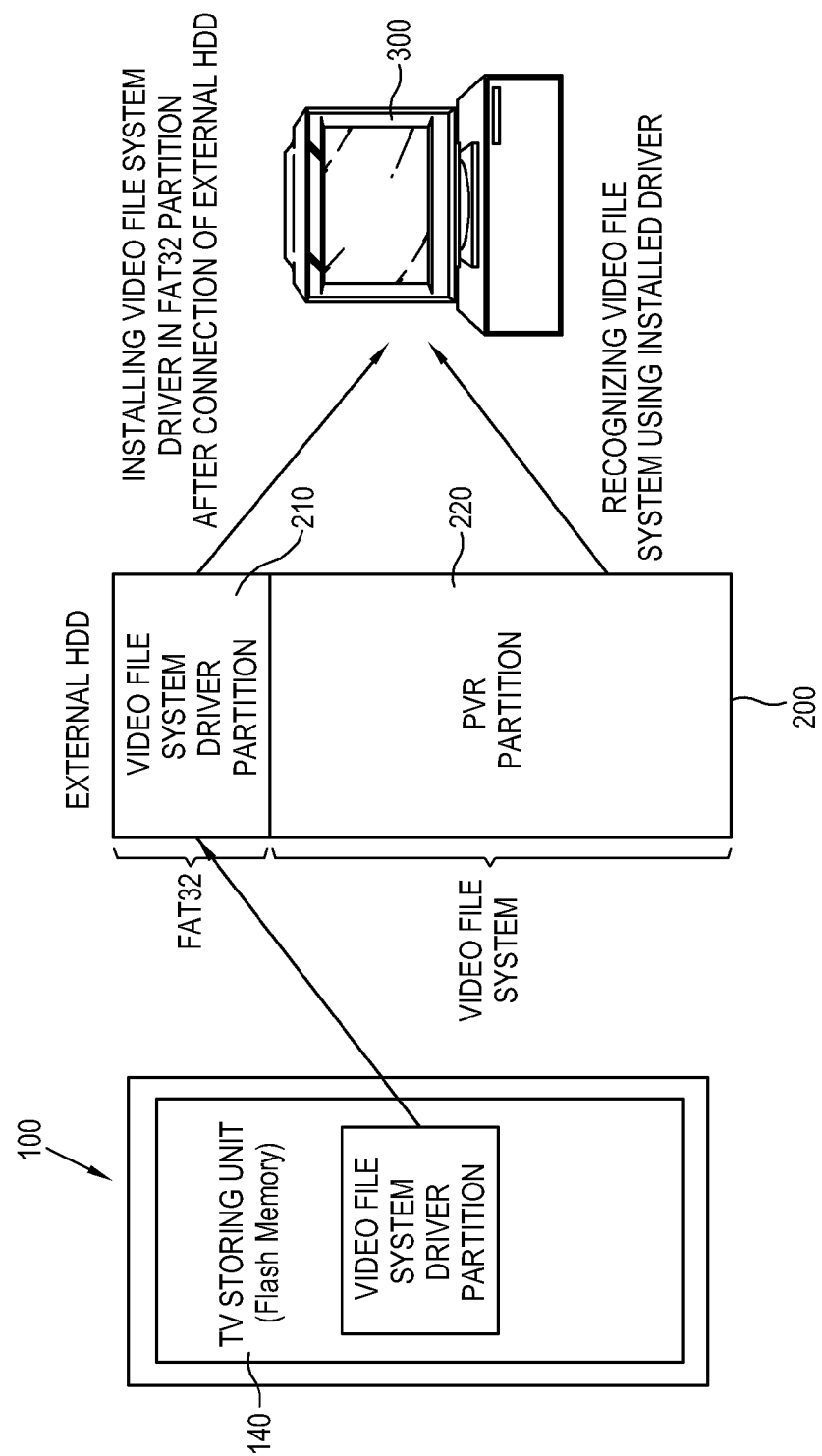
FIG. 2 illustrates a connection of the video processing apparatus in FIG. 1, an external storing unit and a computer.

If the external storing unit 200 is not pre-divided into the plurality of partitions, the controller 160 may divide the external storing unit 200 into a plurality of partitions before storing the driver installation program. For example, as shown in FIG. 2, the controller 160 may divide the external storing unit 200 into a first partition 210 and a second partition 220, and then, format the first partition 210 in the FAT32 file system and format the second partition 220 in the video file system. In the present embodiment, the first partition 210 may have such a size that the driver installation program can be stored therein, and the remaining items to be stored may be allocated to the second partition 220. The controller 160 reproduces and stores the driver installation program of the video file system stored in the storing unit 140 into the first partition 210, and stores the video data in the second partition 220.

If the external storing unit 200 in which the video data and the driver installation program are stored is connected to the computer 300 through the video processing apparatus 100, a driver of the video data is installed into the computer 300 by the driver installation program stored in the first partition 210. The computer 300 can recognize the video data in the second partition 220 through the installed driver.

As described above, the video processing apparatus 100 according to the present embodiment can store the video data and the driver installation program for allowing the computer 300 to process the video data in the external storing unit 200, without a separate driver CD.

If the external storing unit 200 is connected to the video processing apparatus 100, the controller 160 may determine whether or not the driver installation program is stored in the external storing unit 200, and if not, may store the driver installation program in the external storing unit 200.

Figure 3:
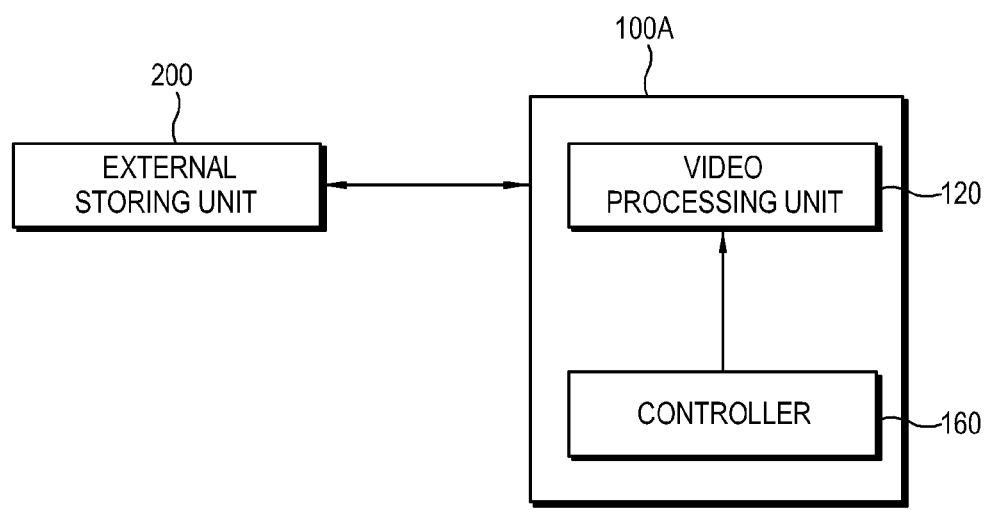
FIG. 3 is a block diagram illustrating a video processing apparatus according to another exemplary embodiment of the present invention.

As shown in FIG. 3, a video processing apparatus 100A according to another exemplary embodiment of the present invention may include a video processing unit 120 and a controller 160. The elements of the video processing apparatus 100A is similar to those of the above-described video processing apparatus 100, and thus, detailed description thereof will be omitted.

Figure 4:
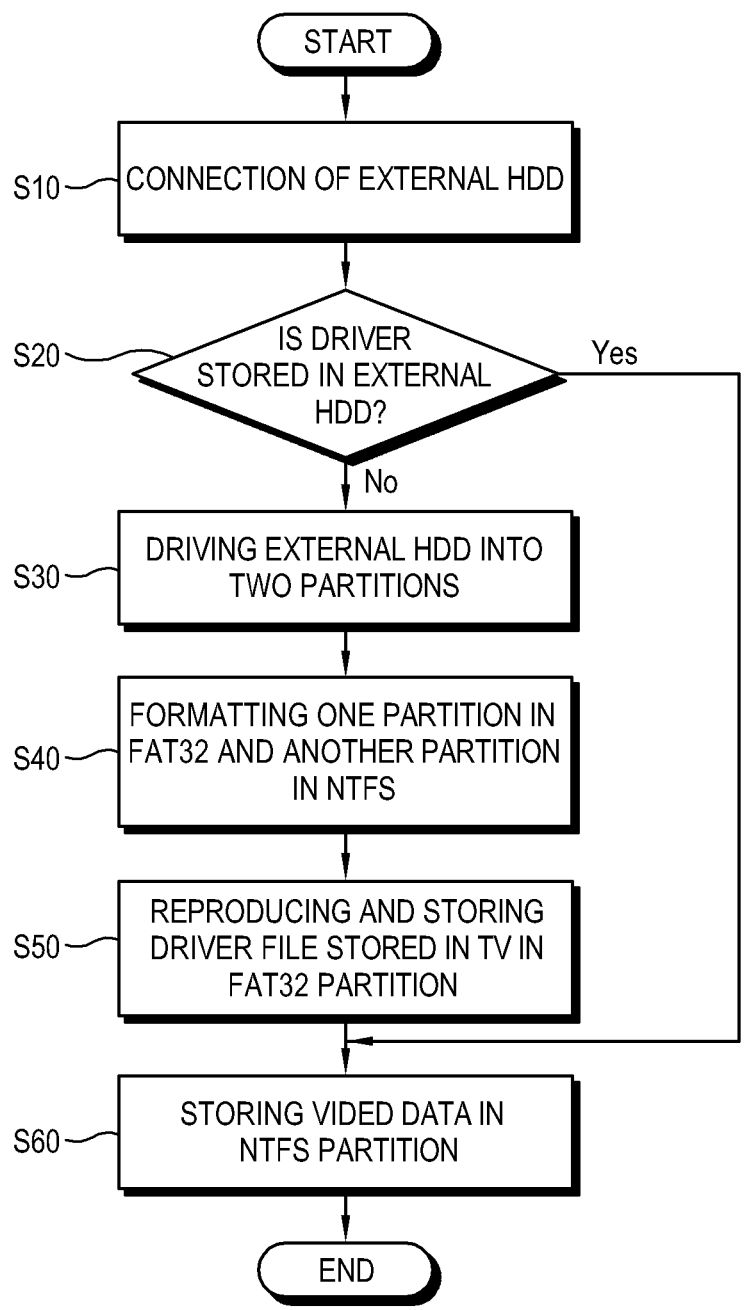
FIG. 4 is a flow chart for illustrating a control method of the video processing apparatus according to an exemplary embodiment of the present invention.

Hereinafter, a control method of a video processing apparatus according to an exemplary embodiment of the present invention will be described referring to FIG. 4.

First, the video processing apparatus 100 determines whether or not the external storing unit 200 is connected to the video processing apparatus 100 (S10).

Then, the video processing apparatus 100 determines whether or not the driver installation program is stored in the external storing unit 200 (S20).

If the driver installation program is not stored in the external storing unit 200, the video processing apparatus 100 divides the external storing unit 200 into two partitions (S30).

Before operation S30, the video processing apparatus 100 may request a user approval for the partition division considering that data stored in the external storing unit 200 may be erased during the partition division.

Next, the video processing apparatus 100 formats one of the partitions of the external storing unit 200 in the computer file system, and formats the other one thereof in the video file system (S40). For example, the computer file system may be FAT32, and the video file system may be NSFS.

The video processing apparatus 100 reproduces and stores the pre-stored driver installation program in the partition formatted in FAT32 (S50), and stores the video data in the partition formatted in NSFS (S60).

As described above, according to the present invention, video data can be stored in an external storing unit in a video file system without a separate driver CD, thereby decreasing manufacturing cost and providing a user with a convenience of being free of managing the driver CD.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus comprising:
   a video processing unit to process video data to display an image; and
   a controller to store the video data in one of a plurality of partitions of an external storing unit which is formatted by a video file system and to store a driver installation program for allowing a computer to process the video data in another one of the plurality of partitions of the external storing unit which is formatted by a computer file system,
   wherein if the external storing unit is connected to the video processing apparatus, the controller determines whether or not the driver installation program is stored in the external storing unit, and if the driver installation program is not stored in the external storing unit, controls to store the driver installation program in the external storing unit,
   wherein the video file system is an exclusive use file system for a video play/edit function other than the computer file system.

2. The video processing apparatus according to claim 1, wherein the computer file system comprises one of FAT16, FAT32 and NTFS.

3. The video processing apparatus according to claim 1, further comprising: a storing unit in which the driver installation program is stored.

4. The video processing apparatus according to claim 1, wherein the controller controls to divide the external storing unit into the plurality of partitions.

5. The video processing apparatus according to claim 1, further comprising: a user interface (UI) generating unit which generates a UI for storing the driver installation program.

6. The video processing apparatus according to claim 1, further comprising: a display unit which displays an image based on the video data processed by the video processing unit.

7. The video processing apparatus according to claim 3, wherein the controller controls to reproduce the driver installation program stored in the storing unit into the external storing unit.

8. A control method of a video processing apparatus, comprising:
   processing video data to display an image;
   storing the video data in one of a plurality of partitions of an external storing unit which is formatted by a video file system;
   determining whether or not a driver installation program for allowing a computer to process the video data is stored in the external storing unit if the external storing unit is connected to the video processing apparatus; and
   storing the driver installation program in another one of the plurality of partitions of the external storing unit which is formatted by a computer file system if the driver installation program is not stored in the external storing unit
   wherein, the video file system is an exclusive use file system for a video play/edit function other than the computer file system.

9. The control method according to claim 8, wherein the computer file system comprises one of FAT16, FAT32 and NTFS.

10. The control method according to claim 8, wherein the storing the driver installation program comprises reproducing the driver installation program which is pre-stored into the external storing unit.

11. The control method according to claim 8, further comprising: dividing the external storing unit into the plurality of partitions.

12. The control method according to claim 8, further comprising: generating a UI for storing the driver installation program.

13. The control method according to claim 8, further comprising: displaying an image based on the video data.

* * * * *